(12) United States Patent
Pritchard (10) Patent No.: US 10,381,814 B1
(45) Date of Patent: Aug. 13, 2019

(54) ELECTRICAL JUNCTION BOX (71) Applicant: Jacob Pritchard, Mt. Shasta, CA (US)

(72) Inventor: Jacob Pritchard, Mt. Shasta, CA (US)

(*) Notice: Subject to any disclaimer, the term of this patent is extended or adjusted under 35 U.S.C. 154(b) by 0 days.

(21) Appl. No.: 15/867,305

(22) Filed: Jan. 10, 2018

(51) Int. Cl.
*H02G 3/08* (2006.01)
*H01R 4/70* (2006.01)
*H01R 4/12* (2006.01)

(52) U.S. Cl.
CPC ............... *H02G 3/083* (2013.01); *H01R 4/12* (2013.01); *H01R 4/70* (2013.01); *H02G 3/081* (2013.01)

(58) Field of Classification Search
CPC ...................................................... H02G 3/083
See application file for complete search history.

(56) References Cited

U.S. PATENT DOCUMENTS

| 3,634,599 | A | | 1/1972 | Kliewer | |
|---|---|---|---|---|---|
| 4,051,322 | A | | 9/1977 | Park et al. | |
| 4,644,610 | A | * | 2/1987 | Fish | A01G 13/04 211/70.6 |
| 4,721,476 | A | | 1/1988 | Zeliff et al. | |
| 5,003,278 | A | * | 3/1991 | May | H01F 17/06 174/92 |
| 5,755,588 | A | * | 5/1998 | Sweatman | H01R 13/6392 439/369 |
| 5,961,341 | A | | 10/1999 | Knowles et al. | |
| 6,099,340 | A | * | 8/2000 | Florentine | H01R 13/6392 439/367 |
| 7,235,740 | B2 | | 6/2007 | Dinh | |
| D770,984 | S | | 11/2016 | Leung | |
| 2006/0011372 | A1 | * | 1/2006 | Rodrigues | H01R 4/70 174/92 |
| 2014/0158394 | A1 | | 6/2014 | Velasquez | |

* cited by examiner

*Primary Examiner* — Hung V Ngo
(74) *Attorney, Agent, or Firm* — Cramer Patent & Design, PLLC; Aaron R. Cramer (57) ABSTRACT

An electrical junction box includes a housing assembly that is openable and closable. The electrical junction box also includes a plurality of pass-through apertures, each pass-through aperture being formed through the housing assembly, and a plurality of bushings, each bushing being located within one (1) of the pass-through apertures. The housing assembly is configured to enclose an electrical splice. With the housing assembly being open, each one (1) of the bushings is configured to receive an electrical wire forming a portion of the electrical splice. With the housing assembly being closed, each one (1) of the bushings is configured to prevent linear movement of the electrical wire along a center axis of the pass-through aperture relative to the housing assembly.

5 Claims, 5 Drawing Sheets

ELECTRICAL JUNCTION BOX

RELATED APPLICATIONS

Not applicable

FIELD OF THE INVENTION

The present invention relates to electrical junction boxes and, more particularly, to an electrical junction box that encloses electrical spices and retains electrical wires.

BACKGROUND OF THE INVENTION

In construction of many commercial, industrial, and residential space, building codes require the use of an electrical junction box to protect electrical connections, such as ends of electrical wires that terminate in an open electrical splice. One (1) problem with traditional electrical junction boxes is that installation can be difficult and/or involve unnecessary steps, such as removing knockouts provided in the walls of the junction box, removing and reattaching a cover of the junction box, securing the electrical wires to the junction box so the electrical splice cannot be pulled apart, and the like. Another problem with traditional electrical junction boxes is that they typically require multiple boxes and/or the use of electrical extensions to make the desired electrical connection and/or electrical split. Accordingly, there remains a need for an electrical junction box that overcomes these problems.

SUMMARY OF THE INVENTION

The inventor has recognized the aforementioned, inherent problems and lack in the art and observed that there is a need new and improved electrical junction box. The development of the present invention, which will be described in greater detail herein, fulfills this need.

In an embodiment, the disclosed electrical junction box includes a housing assembly that is openable and closable. The electrical junction box also includes a plurality of pass-through apertures, each pass-through aperture being formed through the housing assembly, and a plurality of bushings, each bushing being located within one of the pass-through apertures. The housing assembly is configured to enclose an electrical splice. With the housing assembly being open, each one (1) of the bushings is configured to receive an electrical wire forming a portion of the electrical splice. With the housing assembly being closed, each one (1) of the bushings is configured to prevent linear movement of the electrical wire along a center axis of the pass-through aperture relative to the housing assembly.

In another embodiment, the disclosed electrical junction box includes a housing base and a housing cover, pivotally connected to the housing base and selectively movable relative to the housing base between an open position and a closed position. With the housing cover in the closed position relative to the housing base, the housing base and the housing cover define an open housing interior configured to enclose an electrical splice. The electrical junction box also includes a plurality of pass-through apertures, each pass-through aperture being partially formed through the housing base and partially formed through the housing cover, and a plurality of bushings, each bushing being located within one (1) of the pass-through apertures. With the housing cover in the open position relative to the housing base, each one (1) of the bushings is configured to receive an electrical wire forming a portion of the electrical splice. With the housing cover in the closed position relative to the housing base, each one (1) of the bushings is configured to prevent linear movement of the electrical wire along a center axis of the pass-through aperture relative to the housing assembly.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 electrical junction box
12 housing assembly
14 electrical splice
16 electrical wires
18 housing base
20 housing cover
22 anchoring tab
24 support structure
26 pass-through aperture
28 bushing
30 locking mechanism
32 base sidewall
34 base bottom
36 base interior
38 cover sidewall
40 cover top
42 cover interior
44 hinge
46 first locking feature
48 second locking feature
50 first aperture portion
52 second aperture portion
54 first bushing portion
56 second bushing portion
58 fastener aperture
60 fastener
62 pivot axis
64 base opening
66 cover opening 68 housing interior
70 center axis
72 bushing body
74 bushing teeth
76 terminal end

DETAILED DESCRIPTION OF THE PREFERRED EMBODIMENT

In accordance with the invention, the best mode is presented in terms of the illustrative example embodiments, herein depicted within FIGS. 1-4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to a coupling or linking. Connected objects can be directly coupled to one (1) another or can be indirectly coupled to one (1) another, such as via another object.

As used herein, the terms "first," "second," etc. are used merely as labels and do not impose any positional or hierarchical requirements on the item to which the term refers.

As used herein, relative terms, such as "inner," "interior," "outer," "exterior," "top," "bottom," "front," "rear," "back," "left," "right," "upper," "lower," "inside," "outside," "upwardly," "downwardly," "vertical," "vertically," "lateral," "laterally," "above," "below," and similar terms reference relative example positions and/or orientations of the item, element, or feature to which the term refers, for example, as illustrated in the accompanying drawings, but may or may not require a particular position and/or orientation during manufacture and/or use.

In the following description, various illustrative embodiments of the disclosed electrical junction box are provided, which may be practiced without some or all of the particular elements associated with any one of the disclosed embodiments. In some instances, details of known devices and/or processes have been omitted to avoid unnecessarily obscuring the disclosure. While some examples will be described in conjunction with specific illustrated embodiments, these examples are not intended to be limiting. As such, reference herein to "an embodiment," "another embodiment," "an example," and "another example" means that one (1) or more element described in connection with that embodiment or example is included in at least one (1) implementation of the disclosed electrical junction box.

Referring generally to FIGS. 1-4, disclosed is electrical junction box 10, where like reference numerals represent similar or like parts. Generally, the disclosed electrical junction box 10 includes a housing, or box, assembly 12 that is closable (i.e., configured to be selectively closed) to securely protect and enclose an electrical splice 14 and openable (i.e., configured to be selectively opened) to enable quick and easy access to the electrical splice 14. As used herein, the term "configured" means that an element or feature is designed or constructed to be used or operated in the manner that the term refers and/or includes structural attributes that enable performance of the related function.

Figure 1:
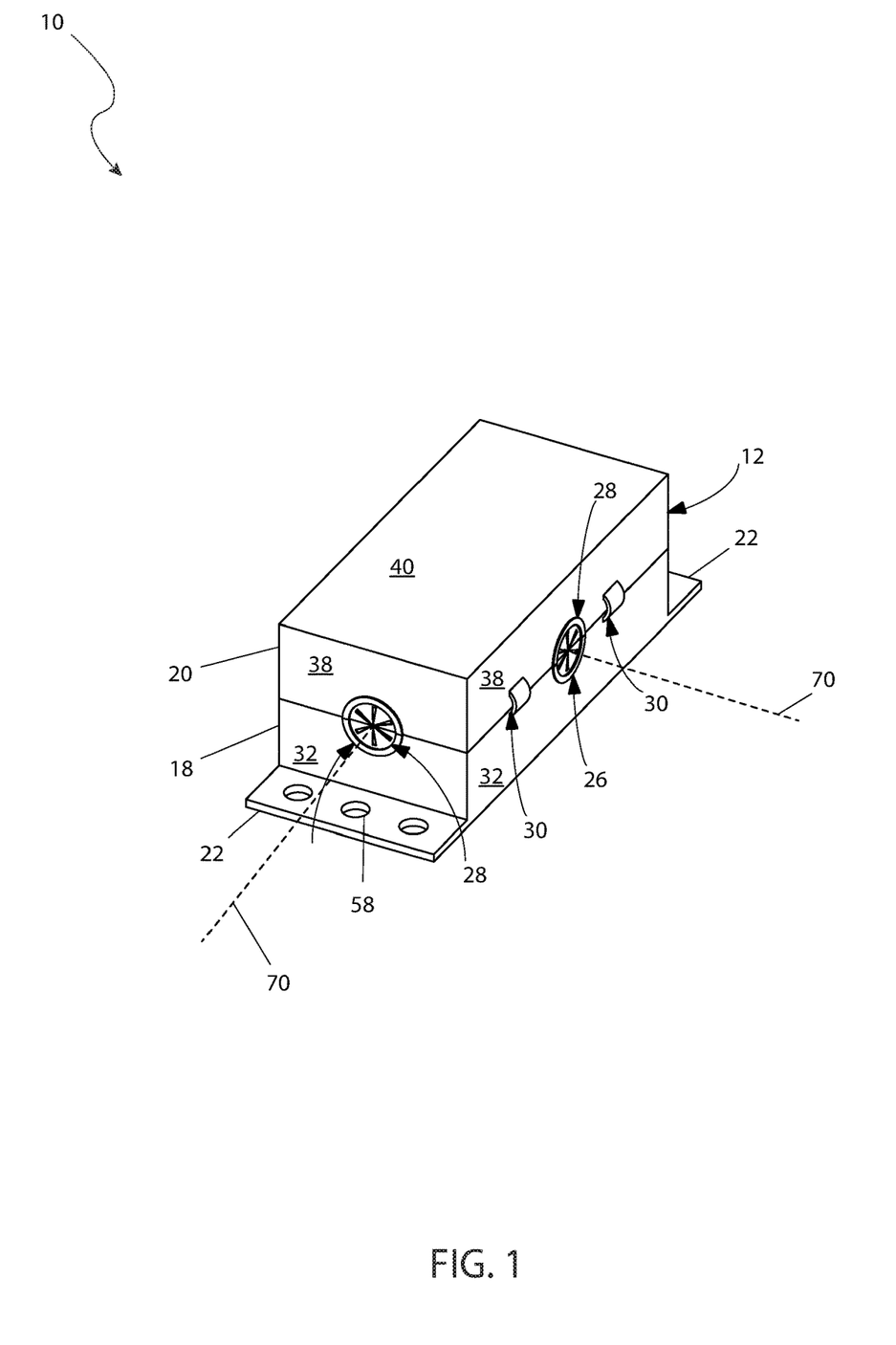
FIG. 1 is a perspective view of an embodiment of the disclosed electrical junction box, shown in a closed position.
Figure 2:
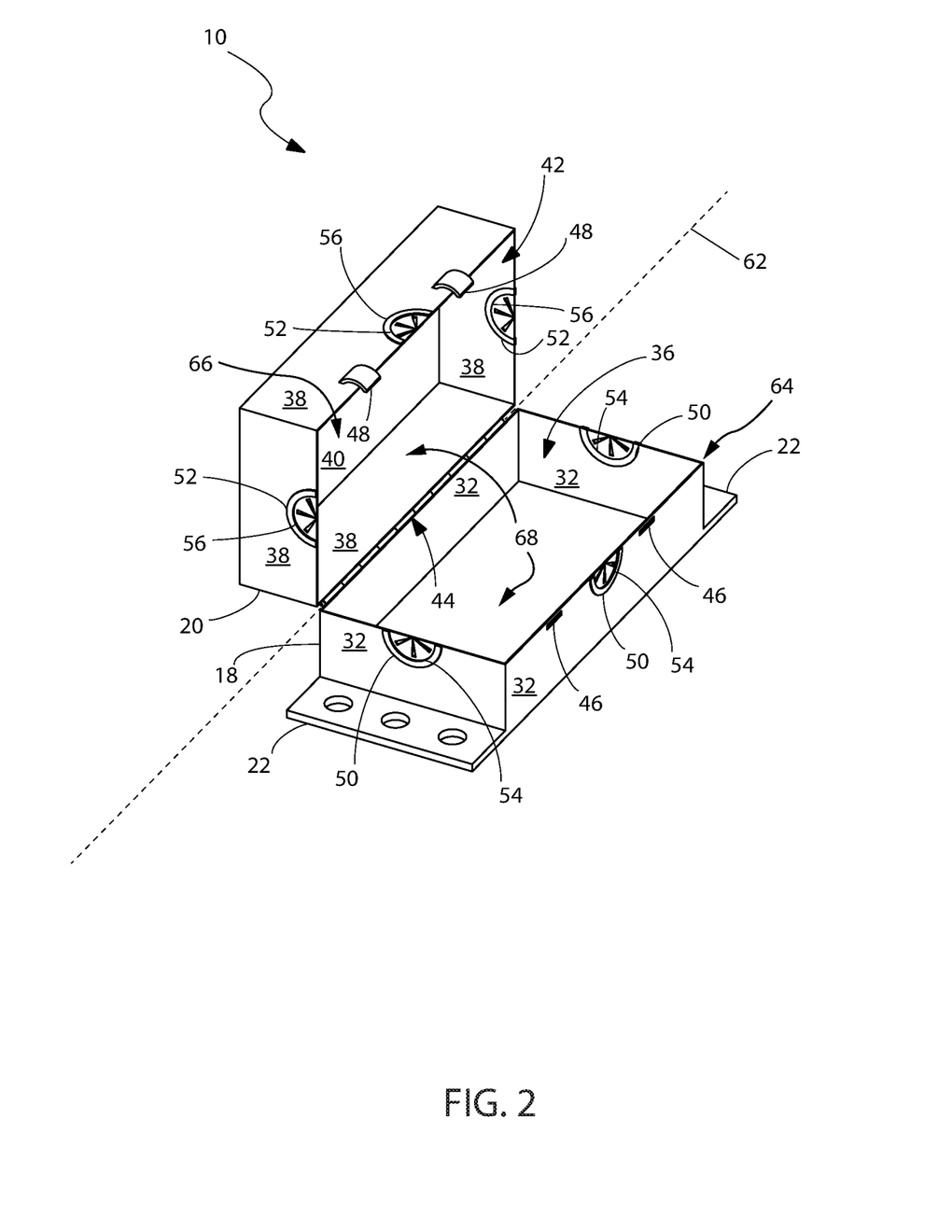
FIG. 2 is a perspective view of an embodiment of the disclosed electrical junction box, shown in an open position.

Referring to FIGS. 1 and 2, the housing assembly 12 includes a housing base 18 and a housing cover 20 connected to the housing base 18. The housing cover 20 is selectively movable relative to the housing base 18 between a closed position (FIG. 1) and an open position (FIG. 2). In an example, the housing cover 20 is pivotable relative to the housing base 18. In an example, the housing cover 20 is pivotable along a pivot axis 62 (FIG. 2) relative to the housing base 18.

The housing base 18 includes a plurality of base walls, for example, four (4) base sidewalls 32, and a bottom 34 (FIG. 4) that define an open base interior 36 (FIG. 2). The base walls 32 are arranged to define a base opening 64 (FIG. 2), opposite the base bottom 34 The base opening 64 provides access to the base interior 36 when the housing cover 20 is in the open position relative to the housing base 18.

The housing cover 20 includes a plurality of cover walls, for example, four (4) cover sidewalls 38, and a cover top 40 that define an open cover interior 42 (FIG. 2). The cover walls 38 are arranged to define a cover opening 66 (FIG. 2), opposite the cover top 40. The cover opening 66 provides access to the cover interior 38 when the housing cover 20 is in the open position relative to the housing base 18.

The housing base 18 and the housing cover 20 (i.e., the housing assembly 12) define an open housing interior 68 (FIG. 2) when the housing cover 20 is in the closed position relative to the housing base 18, as illustrated in FIG. 1. The housing interior 68 is defined by, or is formed from, a combination of the base interior 36 and the cover interior 38 when the housing cover 20 is in the closed position relative to the housing base 18.

In an example, the housing assembly 12 includes a hinge 44 (FIG. 2) connecting the housing cover 20 to the housing base 18. The hinge 44 defines the pivot axis 62 (FIG. 2). The hinge 44 is operable to enable the housing cover 20 to pivot relative to the housing base 18 between the closed position (FIG. 1) and the open position (FIG. 2). In various examples, the hinge 44 is any one (1) of various types of hinging mechanisms configured to enable the housing assembly 12 to be opened (FIG. 2) and closed (FIG. 1). In an example, a first hinge portion of the hinge 44 is connected to or is disposed on one (1) of the base walls 32 proximate to the opening of the housing base 18. A second hinge portion of the hinge 44 is connected to or is disposed on one (1) of the cover walls 38 proximate to the opening of the housing cover 20.

In an example, the electrical junction box 10 includes at least one (1) locking mechanism 30 (FIG. 1) located on the housing assembly 12. The locking mechanism 30 is operable to lock the housing cover 20 in the closed position relative to the housing base 18. In various examples, the locking mechanism 30 is any one (1) of various types of cooperating locks, latches, catches, or fasteners configured securely retain the housing assembly 12 in the closed position (FIG. 1). In an example, the locking mechanism 30 includes a first locking feature 46 and a second locking feature 48 (FIG. 2) that cooperatively engage each other to retain the housing cover 20 in the closed position relative to the housing base 18. In an example, the first locking feature 46 is located on one (1) of the base walls 32 proximate to the opening of the housing base 18, for example, opposite the hinge 44, and the second locking feature 48 is located on one (1) of the cover walls 38 proximate to the opening of the housing cover 20, for example, opposite the hinge 44. In an example, the first locking feature 46 is a female locking element and the second locking feature 48 is a male locking element. The male locking element of the second locking feature 48 is configured to matingly engage and interlock with the female locking element of the first locking feature 46. Alternatively, in another example, the second locking feature 48 is the female locking element and the first locking feature 46 is a male locking element, configured to matingly engage and interlock with the female locking element. In the illustrative example, the housing assembly 12 includes two (2) locking mechanisms 30 (FIG. 1), each having the first locking feature 46 and the second locking feature 48 (FIG. 2), however, in other examples, additional or less locking mechanisms can be used.

Figure 3:
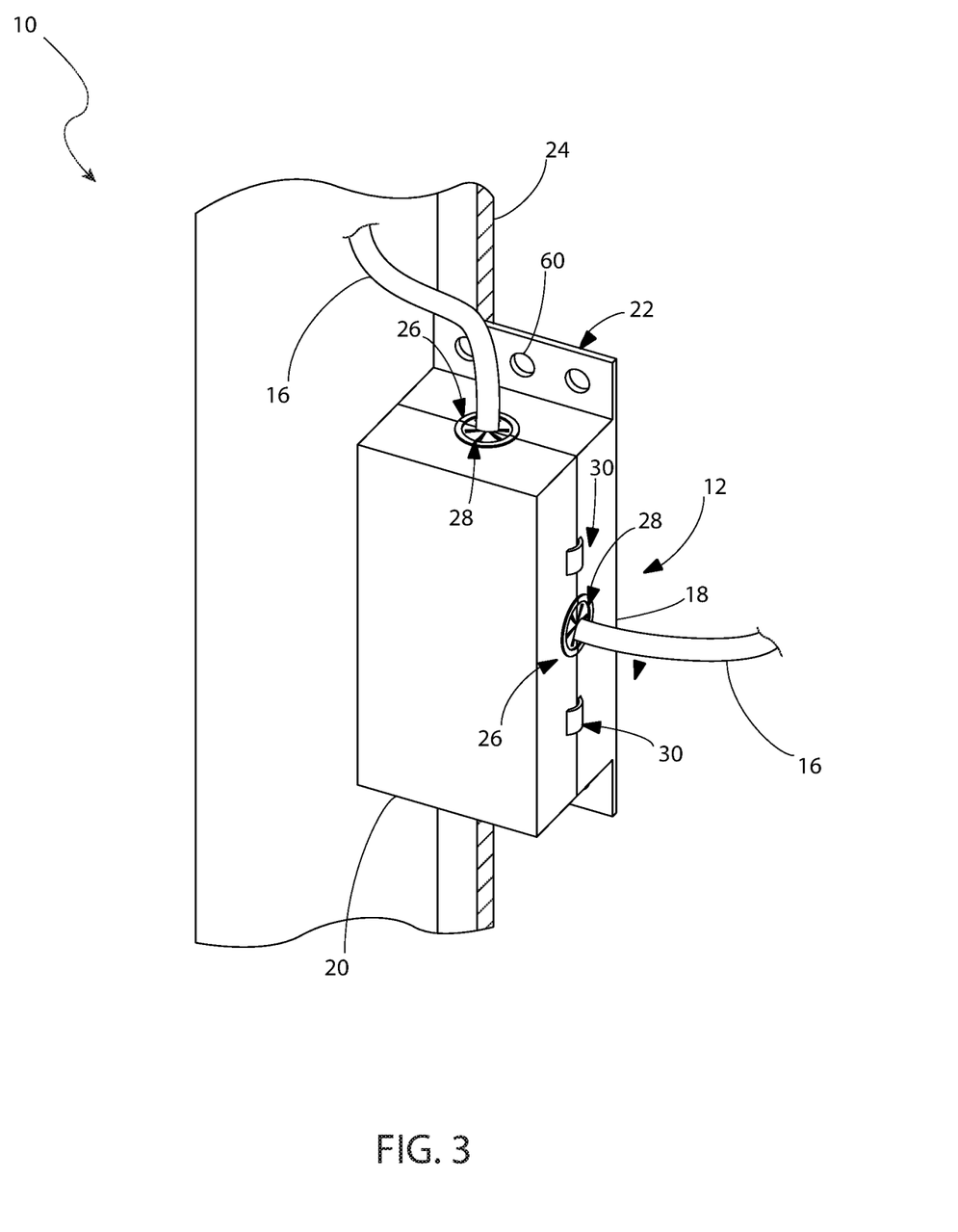
FIG. 3 is an environmental, perspective view of an embodiment of the disclosed electrical junction box, shown in the closed position.
Figure 4:
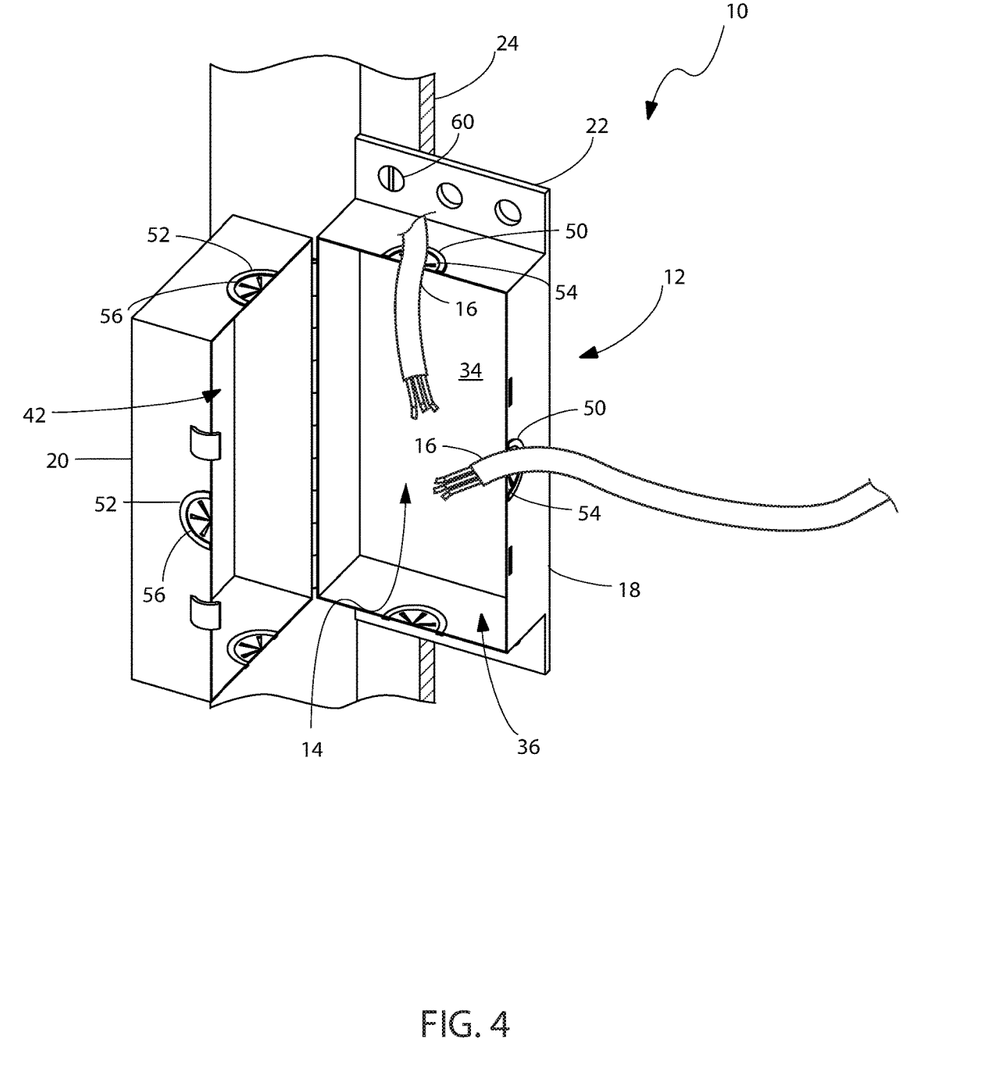
FIG. 4 is an environmental, perspective view of an embodiment of the disclosed electrical junction box, shown in the open position; and, FIG. 5 is a partial, elevational view of an embodiment of a pass-through aperture and bushing of the disclosed electrical junction box.

In an example, the electrical junction box 10 includes a plurality of pass-through apertures 26 (FIG. 1) disposed through the housing assembly 12. The housing assembly 12 is configured to enclose the electrical splice 14 (FIG. 4). With the housing assembly 12 being open, as illustrated in FIGS. 2 and 4, each one (1) of the pass-through apertures 26 is configured to receive an electrical wire 16 (FIG. 4) forming a portion of the electrical splice 14. With the housing assembly 12 being closed, as illustrated in FIGS. 1 and 3, each one (1) of the pass-through apertures 26 is configured to prevent linear movement of the electrical wire 16 along a center axis 70 of the pass-through aperture 26 relative to the housing assembly 12.

Each aperture 26 is configured to enable an electrical wire 16 (FIGS. 3 and 4) to pass through the housing assembly 12 such that a terminal end of the electrical wire 16 is located within the open housing interior 68 of the housing assembly 12, defined by a combination of the base interior 36 and the cover interior 42 (FIG. 2), when the housing assembly 12 is in the closed position. In an example, the aperture 26 has as inside dimension (e.g., a diameter) of between approximately one-half of an inch (½ in.) and approximately three-quarters of an inch (¾ in.). In an example, the aperture 26 has a circular or approximately circular (e.g., elliptical) shape; however, pass-through apertures 26 having other shapes are also contemplated.

In an example, the electrical junction box 10 includes a plurality of bushings 28 lining the plurality of pass-through apertures 26. With the housing assembly 12 being open, each one (1) of the bushings 28 is configured to receive the electrical wire 16 forming a portion of the electrical splice 14. With the housing assembly 12 being closed, each one (1) of the bushings 28 is configured to prevent linear movement of the electrical wire 16 relative to the housing assembly 12. In an example, each bushing 28 includes an annular or tubular bushing body 72 located within and lining a perimeter of an associated pass-through aperture 26. Each bushing 28 is configured to enable the electrical wire 16 (FIGS. 3 and 4) to pass through the housing assembly 12 such that the terminal end of the electrical wire 16 is located within the open interior of the housing assembly 12, defined by a combination of the base interior 36 and the cover interior 42 (FIG. 2), when the housing assembly 12 is in the closed position.

Figure 5:
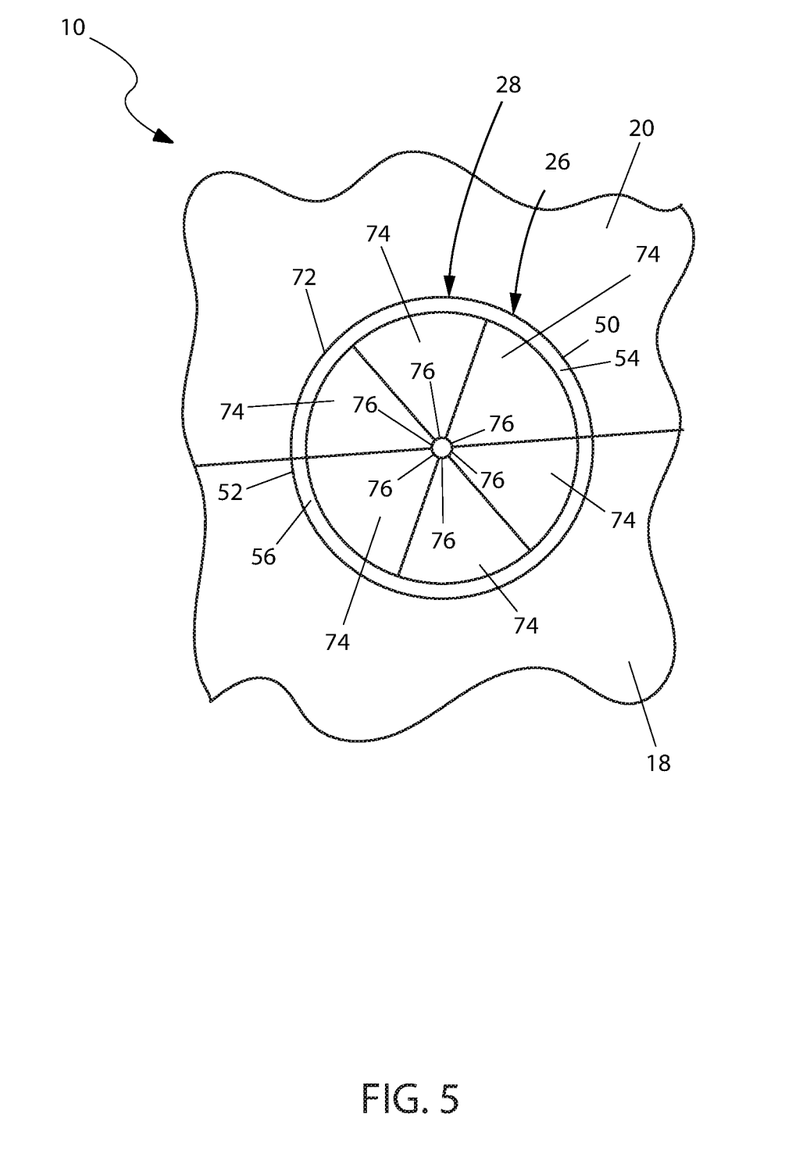

Referring to FIG. 5, in an example, each one (1) of the bushings 28 includes the annular bushing body 72 lining the perimeter of the pass-through aperture 26. Each one (1) of the bushings 28 also includes a plurality of bushing teeth 74. Each one (1) of the bushing teeth 74, also referred to individually as a bushing tooth 74, extend from the bushing body 72 toward the center axis 70 (FIG. 2) of the pass-though aperture 26 and at least partially fills the pass-through aperture 26. In an example, each one (1) of the bushing teeth 74 has a triangular shape as viewed along the center axis 70 of the pass-through aperture 26. In an example, each one (1) of the bushing teeth 74 is oriented perpendicular to the center axis 70 of the pass-through aperture 26. In an example, each one (1) of the bushing teeth 74 converges to a terminal end 76 positioned to engage the electrical wire 16 (FIGS. 3 and 4) located within the pass-through aperture 26. In some examples, terminal ends 76 of the bushing teeth 74 define a central region or area of the pass-through aperture 26, through which the electrical wire 16 passes. In an example, each one (1) of the bushing teeth 74 is flexible. With the housing assembly 12 being closed, the bushing teeth 74 enable the electrical wire 16 to move linearly along the center axis 70 in a first direction (e.g., into the housing interior 68) relative to the housing assembly. With the housing assembly 12 being closed, terminal ends 76 of the bushing teeth 74 engage the electrical wire 16 to prevent linear movement of the electrical wire 16 along the center axis 70 in a second direction (e.g., out from the housing interior 68), opposite the first direction, relative to the housing assembly 12. In an example, the terminal end 76 of each one (1) of the bushing teeth 74 includes a point (e.g., the bushing tooth 74 terminates at a point) that catches and at least partially embeds into an outer jacket of the electrical wire 16 to prevent linear movement.

Referring back to FIGS. 1 and 2, in an example, the electrical junction box 10 includes a plurality of first aperture portions 50 formed or otherwise disposed through the housing base 18 and a plurality of second aperture portions 52 formed or otherwise disposed through the housing cover 20 (FIG. 2). An associated pair of the first aperture portion 50 and the second aperture portion 52 forms the aperture 26 (FIG. 1). In an example, at least one (1) first aperture portion 50 is disposed through two (2) or more of the base walls 32 proximate to the opening of the housing base 18 and at least one (1) second aperture portion 52 is disposed through two (2) of more of the cover walls 38 proximate to the opening of the housing cover 20. Each one (1) of the first aperture portion 50 and the second aperture portion 52 of the associated pair forming the aperture 26 is appropriately located on the housing base 18 and the housing cover 20, respectively, such that when the housing cover 20 is in the closed position relative to the housing base 18 (FIG. 1), the first aperture portion 50 and the second aperture portion 52 align with each other to form the aperture 26. In an example, each one (1) of the first aperture portion 50 and the second aperture portion 52 is semi-circular or approximately semi-circular (e.g., semi-elliptical) to form the aperture 26 when the housing assembly 12 is in the closed position (FIG. 1).

In an example, the electrical junction box 10 includes a plurality of first bushing portions 54 disposed within and lining a perimeter of the plurality of first aperture portions 50 and a plurality of second bushing portions 56 disposed within and lining a perimeter of the plurality of second aperture portions 52 (FIG. 2). An associated pair of the first bushing portion 54 and the second bushing portion 56 forms the bushing 28 (FIG. 1). Each one (1) of the first bushing portion 54 and the second bushing portion 56 of the associated pair forming the bushing 28 is appropriately located on the housing base 18 and the housing cover 20, respectively, such that when the housing cover 20 is in the closed position relative to the housing base 18 (FIG. 1), the first bushing portion 54 and the second bushing portion 56 align with each other to form the bushing 28.

Referring to FIGS. 3 and 4, the electrical junction box 10 is attachable (i.e., configured to the attached) to any support structure 24, such as a section of bare framework construction. In an example, the housing assembly 12 includes at least one (1) anchoring tab 22 connected to and extending outwardly from the housing base 18. The anchoring tab 22 is configured for connecting the housing assembly 12 to the support structure 24, such as a support stud of the framework. In an example, the anchoring tab 22 includes one (1) or more fastener apertures 58 (FIGS. 1 and 2) configured to enable a fastener 60 (FIGS. 3 and 4) to be used to attach the electrical junction box 10 to the support structure 24.

In an example implementation of use, the electrical junction box 10 is attached to a suitable support structure 24 at a desired location for an electrical splice 14. The housing cover 20 is pivoted relative to the housing base 18 into the open position (FIG. 4). The electrical wires 16 are positioned within the first aperture portion 50, lined with the first bushing portion 54, of the housing base 18 and brought to a terminal point within the electrical junction box 10 (e.g., within the base interior 36) for splicing and/or other purposes. Upon splicing the electrical wires 16, the housing cover 20 is pivoted relative to the housing base 18 to the closed position (FIG. 3) such that the second aperture portion 52, lined with the second bushing portion 56, of the housing cover 20 align with the first aperture portion 50, lined with the first bushing portion 54, of the housing base 18 to enclose the electrical wire 16. The locking mechanism 30 (FIG. 3) secured the housing cover 20 in the closed position relative to the housing base 18.

The electrical junction box 10 can be made from any suitable material or combination of materials including, but not limited to: metal, plastic, ceramic, and the like. The electrical junction box 10 can have any appropriate shape and be of any appropriate size, for example, to accommodate a particular installation or application. Because of the variations in the framework and/or space requirements, for example, dictated by the location of electric lines, gas lines, HVAC and the like, the electrical junction box is adaptable to be placed at different orientations, such as a generally, or approximately, horizontal orientation or a generally, or approximately, vertical orientation. In an example, an opposed pair of integral anchoring tabs 22 is provided on the housing assembly 12.

In an example method of use, the disclosed electrical junction box 10 can be installed and utilized by the user in a simple and effortless manner with little or no training. It is envisioned that the electrical junction box 10 would be constructed in general accordance with FIG. 1 and FIG. 2 and would be installed and utilized in general accordance with FIG. 3 and FIG. 4.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An electrical junction box, comprising:
   a generally rectangular-shaped housing assembly that is openable and closable;
   a plurality of pass-through apertures, each pass-through aperture being formed through the housing assembly; and,
   a plurality of bushings, each bushing located within an associated one of the pass-through apertures;
   a locking mechanism configured to secure the housing assembly closed, the housing assembly is configured to enclose an electrical splice of a plurality of wires, said housing assembly includes a housing base, a housing cover connected to the housing base and selectively movable relative to the housing base between an open position and a closed position, with the housing cover in the closed position relative to the housing base, the housing base and the housing cover define a housing interior, the housing cover is pivotable along a pivot axis relative to the housing cover, said housing base includes a plurality of base sidewalls and a base bottom, connected to the base sidewalls, the base sidewalls and the base bottom define a base interior, the base sidewalls define a base opening and the base interior partially defines the housing interior, the housing cover includes a plurality of cover sidewalls, a cover top, connected to the cover sidewalls, the cover sidewalls and the cover top define a cover interior, the cover sidewalls define a cover opening, the cover interior partially defines the housing interior, the housing base comprises a first locking feature, the housing cover comprises a second locking feature, the first locking feature and the second locking feature are configured to be cooperatively engaged together to secure the housing cover in the closed position relative to the housing base, the first locking feature is one of a male locking element or a female locking element, the second locking feature is an opposite one of the male locking element or the female locking element, and with the housing cover in the closed position relative to the housing base, the male locking element is configured to be matingly interlocked with the female locking element to secure the housing cover in the closed position;
   with the housing assembly open, each bushing of the bushings is configured to receive an associated electrical wire of said wires for forming the electrical splice; and,
   with the housing assembly closed each bushing of the bushings is configured to engage its associated electrical wire so as to enable movement in a first direction while preventing movement in an opposite direction.

2. The electrical junction box of claim 1, wherein each one of the bushings comprises:
   an annular bushing body lining a perimeter of the pass-through aperture; and,
   a plurality of bushing teeth, extending from the bushing body toward a center axis of the pass-through aperture and at least partially filling the pass-through aperture.

3. The electrical junction box of claim 2, wherein:
   each one of the bushing teeth has a triangular shape as viewed along the center axis of the pass-through aperture;
   each one of the bushing teeth is oriented perpendicular to the center axis of the passthrough aperture; and,
   each one of the bushing teeth converges to a terminal end positioned to engage the electrical wire located within the pass-through aperture.

4. The electrical junction box of claim 1, wherein the housing assembly further comprises a hinge connected to the housing base and the housing cover.

5. The electrical junction box of claim 1, wherein:
   a first aperture portion of the pass-through aperture is formed in at least one of the base sidewalls adjacent to the base opening;

a second aperture portion of the pass-through aperture is formed in at least one of the cover sidewalls adjacent to the cover opening;

a first bushing portion of the bushing is located within the first aperture portion;

a second bushing portion of the bushing is located within the second aperture portion; and, with the housing cover in the closed position relative to the housing base, the first aperture portion and the second aperture portion align to form the pass-through aperture and the first bushing portion and the second bushing portion align to form the bushing.

\* \* \* \* \*